United States Patent [15] 3,640,853
Ryan [45] Feb. 8, 1972

[54] ADHESION OF NONCONDUCTING AND CONDUCTING MATERIALS

[72] Inventor: Robert J. Ryan, Trenton, N.J.
[73] Assignee: RCA Corporation
[22] Filed: Dec. 27, 1968
[21] Appl. No.: 787,342

[52] U.S. Cl. ................................... 204/15, 117/8, 117/63, 117/71, 117/212, 117/217, 117/218, 204/38 B
[51] Int. Cl. .................................................. C23b 5/48
[58] Field of Search .............. 117/8, 63, 212, 217, 218, 21; 204/15, 38 B, 38 E

[56] References Cited

UNITED STATES PATENTS

| | | | |
|---|---|---|---|
| 2,386,626 | 10/1945 | Nadeau et al. | 117/8 |
| 2,806,256 | 9/1957 | Smith-Johannsen | 117/63 X |
| 2,826,509 | 3/1958 | Sarbach | 117/63 X |
| 2,940,871 | 6/1960 | Smith-Johannsen | 117/63 |
| 3,245,833 | 4/1966 | Trevoy | 117/63 X |
| 3,467,540 | 9/1969 | Schick | 117/63 X |
| 3,486,968 | 12/1969 | Mater | 117/63 X |
| 3,399,268 | 8/1968 | Schneble, Jr. et al. | 117/130 X |

Primary Examiner—Alfred L. Leavitt
Assistant Examiner—Wayne F. Cyron
Attorney—Edward J. Norton

[57] ABSTRACT

An improved metal-to-substrate bond is attained by applying a resinous adhesive mixture to the surface of a nonconducting substrate, the mixture having finely divided particles dispersed therethrough. The particles are thereafter removed from the mixture to provide a microporous tortuous structure upon the substrates. Subsequently deposited metals are keyed into and upon the microporous structural layer to result in greatly improved peel strengths.

10 Claims, 4 Drawing Figures

FIG.I.
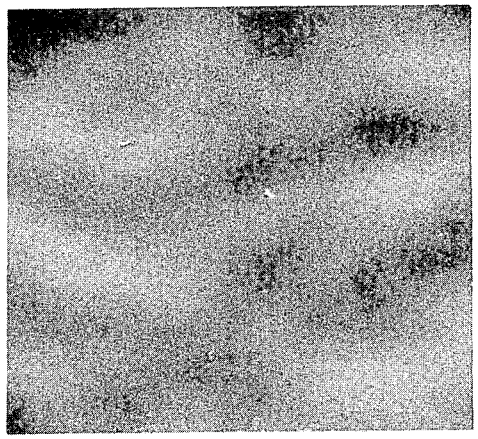
FIG.2.
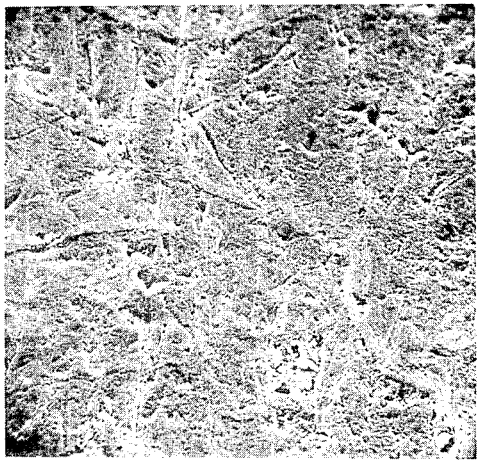
INVENTOR
Robert J. Ryan
BY *JD Lazar*
ATTORNEY INVENTOR
Robert J. Ryan
BY
*JWLazar*
ATTORNEY

PROCESS AND APPARATUS FOR THE CUTTING OF MATERIAL

BACKGROUND

The invention relates to a process and an apparatus for the cutting of material, e.g., flat material such as flat rolled sheets, by means of a shear.

In the known method of cold-cutting flat rolled material, the material is severed in a single cutting action. A prior art apparatus for cold cutting consists of an upper and a lower rotating knife wheel, between which the material is cut as it passes. In this kind of cutting action a bur is produced on the edge opposite the cut edge of the material.

It is the object of the invention to develop a process, as well as an apparatus for performing the process, for the cold cutting of material, especially flat material, e.g., flat rolled metal, such as steel, sheet, in which such a bur is not produced.

THE INVENTION

According to the invention, the material is cut with a shear from one side only to a portion of its thickness, and then is severed from the other side by a shear operating in the reverse direction.

Thus, material is severed into a first part and a second part in two steps. In the first step, the first part is offset from the second part along the cutting path, to only partially cut the first part from the second part, and to displace the first part in elevation from the second part. In the second step, the first part is cut from the second part to sever the first part and the second part by shearing along the cutting path to displace said first part in elevation from the second part in the direction opposite to the displacement of the first and second parts effected in step (a).

An apparatus that is suitable for the performance of the above process is characterized in that successive shears are arranged in the direction of transport of the material, each of which comprises two circular disks which are parallel to one another, which are located close to one another, and which are mounted on rotating shafts whose distance apart, in the case of the first shear that can operate in the direction of the transport of the material, is so great that the margins of the disks are spaced from one another radially by an amount that is smaller than the thickness of the material to be cut, and whose distance apart, in the case of the other shear, is so slight that the margins of the disks overlap or nearly overlap one another in the radial direction, and that the disks of the first shear are arranged inversely (compare FIG. 4 and FIG. 5) to the disks of the second shear.

Thus, the apparatus according to the invention comprises a first pair and a second pair of rotatable, cooperating, shearing disks (FIG. 1). The first pair and second pair of shearing disks are disposed in alignment for cutting the material in succession by, respectively, said first and second pair of shearing disks, along a single path in the material. The radially outwardly disposed edge portions of the disks of said first pair of disks are in radially spaced relation, for cutting to a depth less than the thickness of the material by displacement of the first part of the material relative to the second part of the material. The radially outwardly disposed edge portions of the disks of the second pair of disks, is disposed to displace the first and second parts of the material in the opposite direction to a depth sufficient to sever the first and second parts.

Preferably, to permit cutting of opposite edge portions of material simultaneously, a third and fourth pair of shearing disks are provided, and are, respectively, axially spaced from and parallel to the first and second shears, the disks of said third and fourth shear pairs being arranged in relation to one another the same as the disks of the first two shears.

It is advantageous for the disks of the shears to overlap in the direction of transport of the material, since the overlapping of the disks eliminates the necessity of axial guidance of the rear pair of shafts in the direction of transport of the material.

Preferably all of the shafts are driven, thereby preventing any slippage between the cutting edges and the band, which might result in premature wearing out of the cutters.

Another embodiment, however, is characterized in that at least one pair of shafts forming a shear does not have its own drive. In this case, the diameter of the disks can be freely selected in the case of the nondriven pair of shafts. If the shafts of both shears were driven and the diameter of the disks of one of the shears differed from the diameter of the disks of the other of the shears, synchronizing means would be required. Furthermore, free play in the driving elements of the shaft pairs would not prove disadvantageous.

Embodiments of the invention are explained hereinafter with reference to the drawings, in which:

FIG. 1 is a side elevation of an apparatus according to the invention;

FIG. 2 is a side elevation of the apparatus with partially overlapping shears;

FIG. 2a is a plan view taken along line 2a—2a in FIG. 2;

FIG. 5 is a section in the direction of the arrows on line V—V of FIG. 1; and

FIG. 6 shows the steel band of FIG. 5 with the severed marginal strip, on an enlarged scale.

Figure 3:
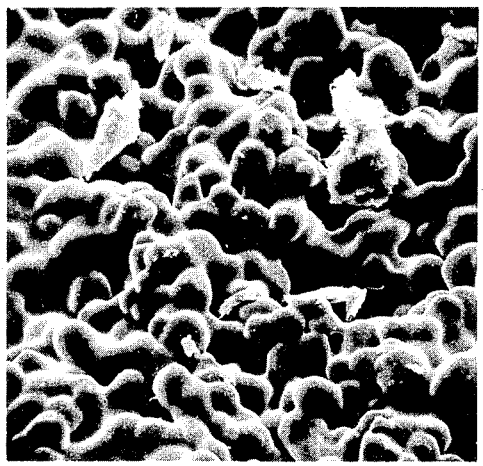
FIG. 3 is a section in the direction of the arrows on line III—III of FIG. 1.

In the arrangement of the apparatus shown in FIG. 1, there are four rotatable shafts parallel to one another, 1, 2 and 11, 12. The shafts 1, 2, 11 and 12 are provided, respectively, with drive means 21, 22, 23 and 24. As can be seen in FIG. 3 and FIG. 5, the shafts carry cylindrical bodies 3, 4 and 13, 14. Spaced cutting disks or shear wheels 5, 7, 6, 8 and 15, 17, 16, 18, which have cylindrical outer surfaces, are mounted on the cylindrical bodies. The arrangement of the shearing disks is such that disk 5 of shaft 1 forms a shear with disk 6 of shaft 2, and disk 7 of shaft 1 forms a shear with disk 8 of shaft 2. The disposition of disks 16, 15 and 17, 18 of shafts 11 and 12 is the same. A steel band 10 is moving between the shear disks, and its marginal strips 10a and 10b extend beyond the cutting edges of the shear disks. The shear shafts 1, 2 and 11, 12 are guided axially by antifriction bearings (not represented).

FIG. 2 and FIG. 2a represent another arrangement of the apparatus, wherein the shear shafts 1, 2, on which disks 5, 7 are mounted, and 11, 12 are arranged so close to one another that the shear disks 5, 6 and 7, 8 of shafts 1 and 2 overlap the shear disks 15, 16 and 17, 18 of shafts 11 and 12. The aligned upper disks and the aligned lower disks overlap preventing axial movement of the shafts. The advantage of this arrangement consists in the fact that no precise axial guidance of the second pair of shafts 11, 12 is needed, since the guidance of the second pair of shafts 11, 12 is provided by the overlapping of the shear disks.

In both arrangements, either all four shafts can be driven, or only one pair of shafts, in which case the other pair of shafts idles. If all shear shafts are driven, the assurance is given that no slipping will occur between the cutting edges and the band, thereby preventing excessive shear wear. If one pair of shafts is not driven, freedom is achieved in the selection of the diameter of the shear disks on this pair of shafts. Furthermore, any free play between the driving members of the first shaft pair and the second will have no adverse effect. Furthermore, the possibility also exists of not driving any of the pairs of shafts. In this case the actual cutting power will be provided by the pull of the winder, unless a band pulling system is used.

FIG. 3 shows the first shaft air 1, 2 of the apparatus. The shear disks 5, 7 and 6, 8 are so adjusted that the radial distance between their cutting edges is smaller than the thickness of the material to be cut, and the disks 5, 7 and 6, 8 are so arranged that their cutting edges are constituted by the outside edge of disks 5 and 7 and the inside edges of disks 6 and 8. In the case of the second pair of rolls 11, 12 of the apparatus, which is represented in FIG. 5, the arrangement of disks 15, 17 and 16, 18 are so adjusted that their cutting edges are approximately Experimentation has shown that the optimum particles to use are those having relatively small linear dimensions yet which provide a relatively large effective area when removed from the mixture. Generally, they should be of a size to result in porous cavities substantially no greater than 2 mils in diameter. Although tests to date have been restricted to particles in solid form, particles in other than the solid state can be substituted with equal success. Of the particles which have been tested, the types which have provided quite favorable results are those particles which are substantially insoluble in the resinous mixture and therefore can be easily leached out or dissolved out after the resin has been dried and/or cured. Fillers which have proven particularly suitable, include salts, starches, and their derivatives which are generally soluble in aqueous solutions. Limited experimentation has been carried out, using sugar fillers with successful results. As used herein, the term leaching is defined to mean the removal of a substance from a medium in which it is relatively insoluble by a second medium in which it is relatively soluble.

FIGS. 1-4 are actual photographs of substrates as seen through a scanning electron microscope at a magnification of 500X.

FIG. 1 is a photograph of the surface of a GE 11571B XXXPC unclad phenolic laminate.

FIG. 2 is a photograph of the surface of a GE 11571B XXXPC unclad phenolic laminate that has been coated with a mixture of PPG Bondmaster E835, a commonly used adhesive, in accordance with the prior art.

FIG. 3 is a photograph of the surface of a GE 11571B XXXPC unclad phenolic laminate that has been coated with a mixture of PPG Bondmaster E835 adhesive to which has been added approximately 20 percent Staley Co. Hamaco 267 starch derivative.

Figure 4:
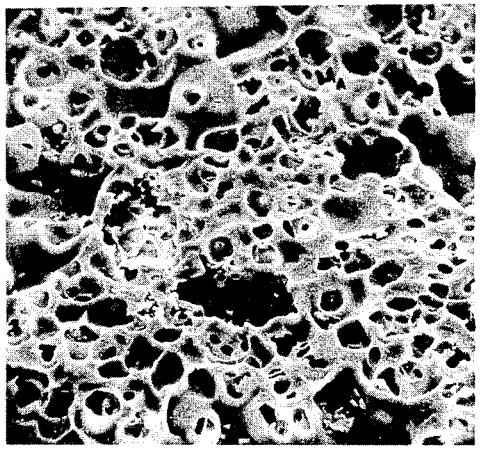
FIG. 4 represents the scored marginal strip of the steel band of FIG. 3, on an enlarged scale.

FIG. 4 is a photograph of the surface of the laminate shown in FIG. 3 after it has been treated to leach out the starch derivative. The tortuous microporous structure produced is readily distinguishable from the surface of the laminates shown in FIGS. 1 and 2. Subsequently deposited conductive material is keyed into this tortuous microporous structure, giving greatly improved adhesion compared with an untreated surface.

Additional mixtures which have been used with equal success are disclosed in the following examples:

Example 1

A mixture comprising 80 percent GE 116-A resin and 20 percent Fisher Scientific Co. soluble starch powder was coated onto a sheet of GE 11571A unclad phenolic laminate, using a doctor blade coater at a setting of 8 mils. The coated laminate was air dried and oven dried for one-half hour at a temperature of approximately 95° C. The samples were treated in various acid solutions to dissolve out the starch and a conductive pattern subsequently built up using electroless and electrolytic plating techniques.

Example 2

A mixture comprising 80 percent GE 116-A resin and 20 percent Morton Extra Fine 200 salt was coated onto a GE 11571A unclad phenolic laminate at a doctor blade setting of 7 mils. The laminate was air dried and oven dried for 1 hour at a temperature of approximately 95° C. The samples were treated in aqueous solutions to leach out the salt and a conductive material subsequently deposited.

Printed circuits which exhibit strikingly improved adhesion between the metal and substrate can be produced in accordance with the foregoing techniques. For example, a layer of resinous mixture as described infra, can be applied to the surface of a material adapted to serve as a printed-circuit substrate, i.e., an unclad phenolic laminate. The resinous layer is thereafter dried and treated to render it microporous throughout. The desired conductive pattern may then be selectively deposited within and upon said microporous layer in accordance with conventional additive techniques. To further improve the adhesive characteristics between the conductive pattern and the substrate, the resinous layer may be advanced to a partially cured state and/or the outer surface thereof eroded prior to the removal of the particle therefrom. The microporous structure should be relatively dry prior to the deposition of the conductive material.

Illustrations of additional methods are set forth below.

Example 3

A resinous mixture having relatively insoluble particles dispersed therethrough is selectively applied to a nonconducting substrate, the configuration formed by said selective application conforming to the configuration of the desired conductive pattern, the resinous portions of said mixture being adhesively compatible with said substrate. The mixture is advanced to a substantially dried state and the relatively insoluable particles leached out therefrom to render said mixture microporous throughout. The microporous structure is thereafter dried and a layer of conducting material deposited within and upon said microporous structure using conventional electroless plating techniques, followed by a further layer of electrolytically deposited conductive material, if desired.

Experimentation has shown that the process is facilitated when a relatively thin electroless layer is first deposited to serve as a base for a subsequently deposited layer of electrolytic material.

Example 4

A layer of resinous mixture, as described infra, is applied to the surface of a nonconducting substrate which is thereafter advanced to a substantially dried state and treated to leach out the particles contained therein. A thin layer of conductive material is subsequently deposited within and upon the treated layer utilizing electroless deposition techniques. A negative pattern of the desired circuit configuration is selectively applied to the electrolessly deposited layer, said pattern being impervious to the deposition of conductive material. The unpatterned portions of the surface, i.e., those portions conforming to the configuration of the desired circuit pattern, are thereafter built up utilizing electrolytic techniques. The pattern is subsequently removed from the board and the relatively thin layer, exposed thereby, stripped via a flash etch.

Example 5

A resinous mixture, as described infra, is selectively applied to a nonconducting substrate, the configuration formed by said selective application conforming to the configuration of the desired circuit pattern. The mixture is thereafter dried, partially cured, and its outer surface eroded and treated to leach out the particles contained therein. After drying a thin layer of conducting material is electrolessly deposited upon the entire surface of the substrate including the portion to which the resinous mixture has been applied. The portions of the substrate to which the mixture was not applied are masked off with a substance impervious to the subsequent deposition of conducting material, and a layer of conducting material electrolytically deposited upon the unmasked portions to form the desired circuit pattern. The masking material is thereafter stripped and the portions of the previously deposited electroless layer, exposed thereby, removed.

Tests carried out on samples made in accordance with the present invention have shown that peel strengths in the order of 11 p.p.i. are attainable, with the limiting factor attributable to rupture within the adhesive layer rather than a breach between either interface, i.e., the adhesive-substrate interface or the adhesive-conductor interface.

What is claimed is:

1. A method of improving the adhesion of conductive material to a nonconductor surface, comprising:
   a. applying a layer of a resinous mixture to said nonconductor surface, said mixture comprising a resin solution having particles dispersed therethrough, the resinous portions thereof being adhesively compatible with said nonconductor surface;
   a1. said particles having a maximum linear dimension of 2 mils, a2. said particles, further, having the properties of being nonreactive with said nonconductor surface, being insoluble in said resin solution, and being soluble in an aqueous leaching agent;

b. drying said layer to a substantially dried state; and c. leaching said particles from said mixture with an aqueous leaching agent to render substantially all of said layer microporous, said microporous layer being adapted thereby to receive subsequently deposited conductive material within the pores as well as on the surface of said microporous layer to provide a mechanical bond between said subsequently deposited conductive material and said microporous layer.

2. The method according to claim 1 including the additional step of electrolessly depositing a layer of conductive material on selected portions of said microporous layer to substantially fill said pores.

3. The method as defined by claim 1 wherein said particles are selected from the group consisting of salts, starches, and starch derivatives.

4. The method according to claim 2 including the additional step of electrolytically depositing a layer of conductive material on said electrolessly deposited conductive layer.

5. The method as defined by claim 1 comprising the step of partially curing said layer prior to leaching said particles from said mixture.

6. The method as defined by claim 1 including the step of eroding the surface of said layer prior to leaching of said particles from said applied layer to facilitate the leaching step.

7. A method for forming a printed circuit, comprising:

a. selectively applying a resinous mixture to a material adapted to serve as a circuit substrate, the configuration formed by said selective application conforming to the configuration of the desired circuit pattern, said mixture comprising a resin solution having relatively insoluble particles dispersed therethrough, the resinous portion of said mixture being adhesively compatible with said material;

a1. said particles having a maximum diameter of 2 mils, a2. said particles, further, having the properties of being nonreactive with said nonconductor surface, being insoluble in said resin solution, and being soluble in an aqueous leaching agent;

b. drying said mixture to a substantially dried state;

c. leaching said particles from said mixture with an aqueous leaching agent to render substantially all of said layer microporous, said microporous layer being adapted thereby to receive subsequently deposited conductive material within the pores as well as on the surface of said microporous layer to provide a mechanical bond between said deposited conductive material and said microporous layer.

d. masking off the portions of said material not containing said mixture with a substance impervious to the deposition of conductive materials;

e. electrolessly depositing a relatively thin layer of conductive material within and upon said microporous structure; and f. electrolytically depositing a layer of conducting material upon said electrolessly deposited layer to form the desired circuit.

8. A method for forming a printed circuit, comprising:

a. applying a layer of a resinous mixture to a material adapted to serve as a circuit substrate;

said mixture comprising resin solution having relatively insoluble particles dispersed therethrough, the resinous portion of said mixture being adhesively compatible with said material;

a1. said particles having a maximum linear dimension of 2 mils, a2. said particles, further, having the properties of being nonreactive with said nonconductor surface, being insoluble in said resin solution, and being soluble in an aqueous leaching agent;

b. drying said mixture to a substantially dried state;

c. leaching said particles from said mixture with an aqueous leaching agent to render substantially all of said layer microporous, said microporous layer being adapted thereby to receive subsequently deposited conductive material within the pores as well as on the surface of said microporous layer to provide a mechanical bond between said subsequently deposited conductive material and said microporous layer.

d. electrolessly depositing a relatively thin layer of conductive material within and upon acid microporous layer;

e. selectively applying a pattern upon said relatively thin layer of conductive material, said pattern being impervious to the deposition of conducting materials;

f. electrolytically depositing a layer of conducting material to the unpatterned portions of said assembly to form the desired circuit;

g. removing the pattern previously applied; and h. removing the portions of the relatively thin layer previously covered by said applied pattern.

9. A method for forming a printed circuit, comprising:

a. selectively applying a resinous mixture to a material adapted to serve as a circuit substrate, the configuration formed by said selective applications conforming to the configuration of the desired circuit pattern, said mixture comprising a resinous solution having relatively insoluble particles dispersed therethrough, the resinous portion of said mixture being adhesively compatible with said mixture;

a1. said particles having a maximum linear dimension of 2 mils, a2. said particles, further, having the properties of being nonreactive with said nonconductor surface, being insoluble in said resin solution, and being soluble in an aqueous leaching agent;

b. drying said mixture to a substantially dried state;

c. leaching said particles from said mixture with an aqueous leaching agent to render substantially all of said layer microporous, said microporous layer being adapted thereby to receive subsequently deposited conductive material within the pores as well as on the surface of said microporous layer to provide a mechanical bond between said deposited conductive material and said microporous layer.

d. electrolessly depositing a relatively thin layer of conductive material upon the entire surface of said circuit substrate;

e. masking off the portions of said substrate not containing said mixture with a substance impervious to the subsequent deposition of conductive material;

f. electrolytically depositing a layer of conducting material upon the unmasked portions of said electrolessly deposited layer to form the desired circuit pattern;

g. removing said impervious substance previously applied; and h. removing the portions of the relatively thin layer previously covered by said impervious substance.

10. The method as defined in claim 2 wherein a further drying step is performed upon said microporous structure prior to the deposition of said conductive material.

* * * * *

UNITED STATES PATENT OFFICE
CERTIFICATE OF CORRECTION

Patent No. 3,640,853                Dated February 8, 1972

Inventor(s) Robert James Ryan

It is certified that error appears in the above-identified patent and that said Letters Patent are hereby corrected as shown below:

In the drawing, "Fig. 1" should read --Fig. 2--; and "Fig. 2" should read --Fig. 1--; Claim 1 line 1 "of" should be --for--; Claim 8 line 4 "comprising resin" should be --comprising a resin--; Claim 8 line 25 "upon acid microporous" should be --upon said microporous--.

Signed and sealed this 27th day of March 1973.

(SEAL)
Attest:

EDWARD M. FLETCHER, JR.            ROBERT GOTTSCHALK
Attesting Officer                    Commissioner of Patents